United States Patent [19]

Koblanski

[11] 4,408,494

[45] Oct. 11, 1983

[54] ULTRASOUND MEASURING INSTRUMENT

[75] Inventor: John N. Koblanski, Burnaby, Canada

[73] Assignee: Ocean Ecology Ltd., Canada

[21] Appl. No.: 288,435

[22] Filed: Jul. 30, 1981

[51] Int. Cl.³ .............................................. G01N 29/00
[52] U.S. Cl. .......................................... 73/646; 73/59
[58] Field of Search ................ 73/646, 645, 647, 648, 73/59

[56] References Cited

U.S. PATENT DOCUMENTS

| | | | |
|---|---|---|---|
| 2,055,713 | 9/1936 | Alder | 73/646 |
| 2,762,447 | 9/1956 | Cady | 73/646 |
| 2,827,978 | 3/1958 | Henry | 73/646 |
| 2,832,214 | 4/1958 | Trommler | 73/606 |
| 3,407,897 | 10/1968 | Jenny | 73/645 |
| 3,572,088 | 3/1971 | Gericke et al. | 73/606 |
| 3,874,794 | 4/1975 | Kiernan | 73/646 |
| 4,099,417 | 7/1978 | Shwartzman | 73/646 |
| 4,104,923 | 8/1978 | Whittingham et al. | 73/646 |
| 4,160,388 | 7/1979 | Carriere | 73/646 |
| 4,179,937 | 12/1979 | Koblanski | 73/646 |

Primary Examiner—Stephan A. Kreitman
Attorney, Agent, or Firm—Townsend and Townsend

[57] ABSTRACT

An instrument for measuring ultrasound has a chamber through which sound waves can travel from end to end of the chamber. An acoustic focusing device near one end of the chamber concentrates the sound waves at a focal point near the opposite end of the chamber. A rotary shutter is supported within the chamber in a position to be rotated by passage of the concentrated sound waves. Devices capable of transmitting and receiving a ray of light are arranged on the instrument so that the light ray is interrupted by the rotary shutter to provide a series of light pulses. A counter is operatively connected to the light receiving device and the series of light pulses are utilized to actuate the counter and provide a reading indicative of the intensity of the sound waves. The instrument may have an additional indicator of the intensity of the sound waves to supplement the reading provided by the counter.

15 Claims, 13 Drawing Figures

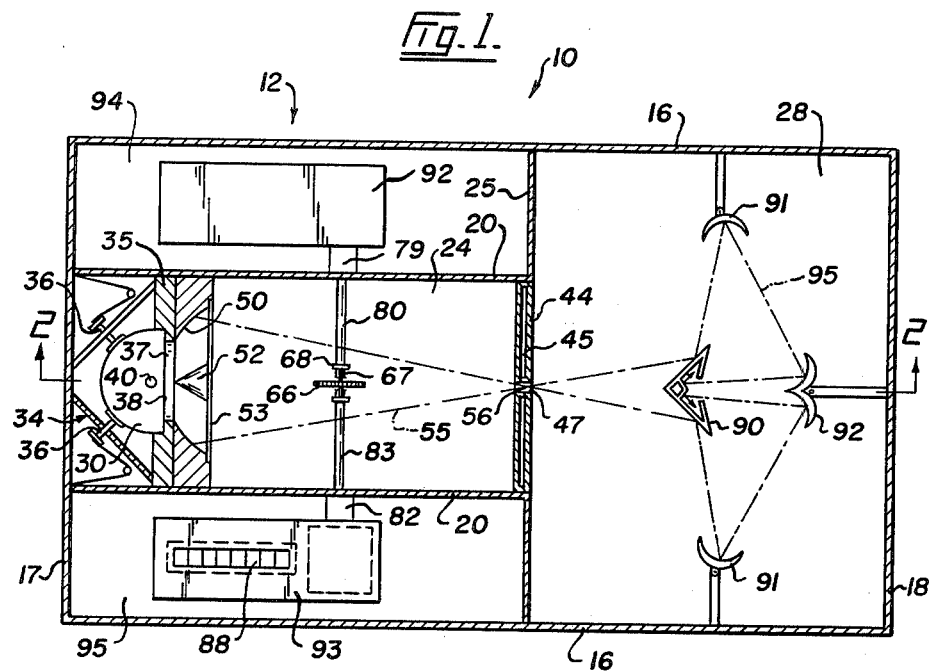
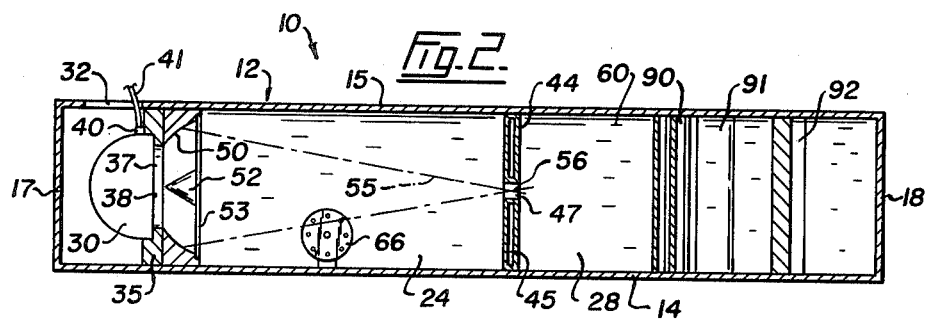
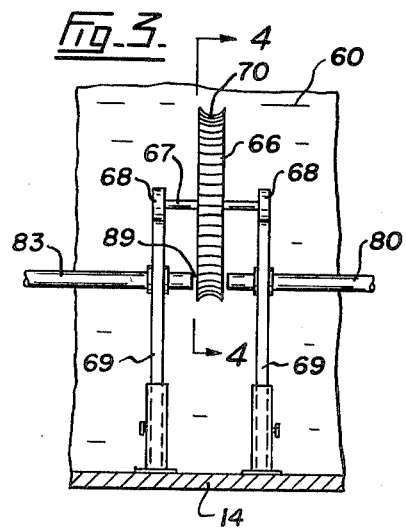
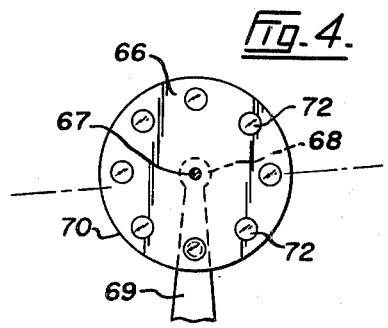

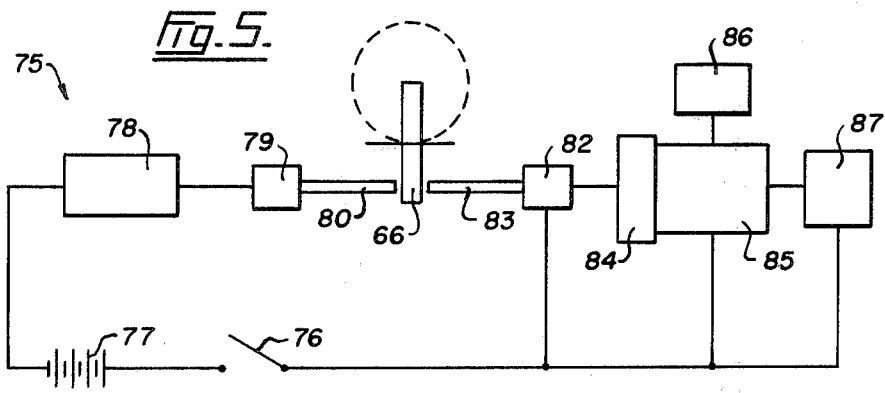
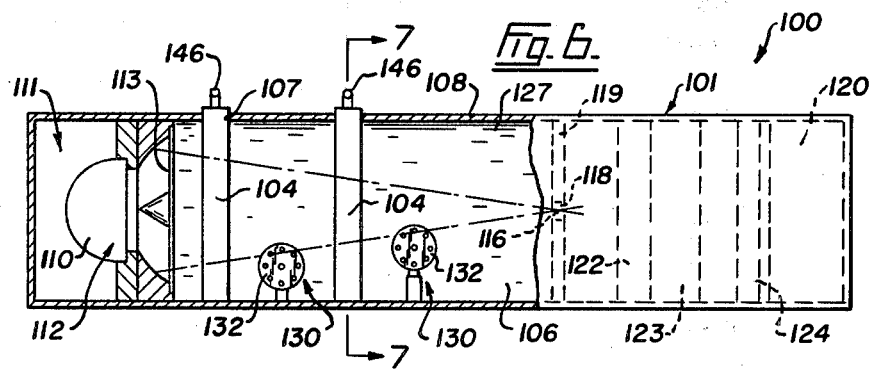
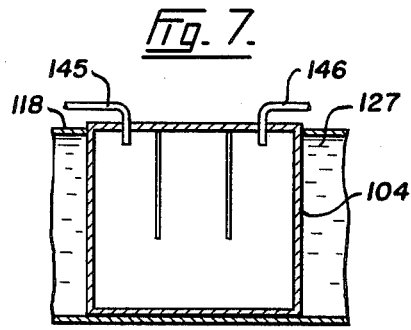
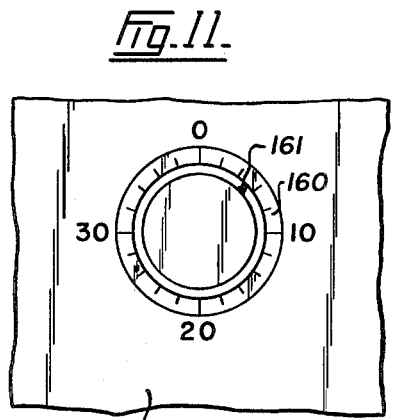
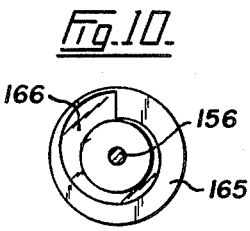

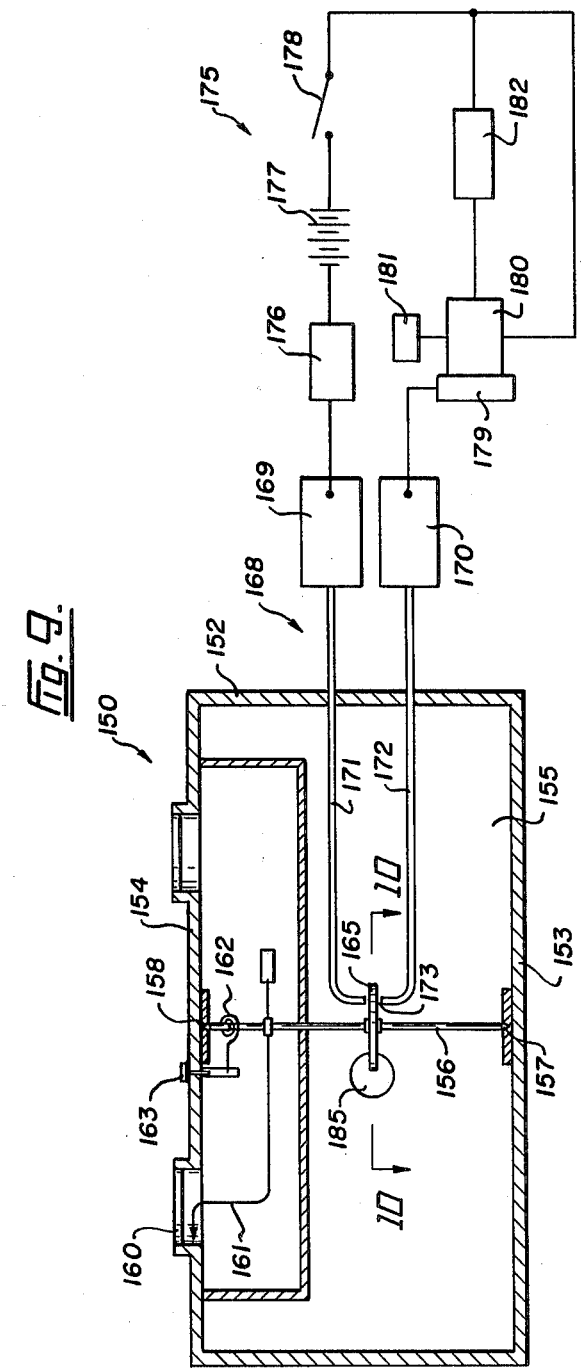

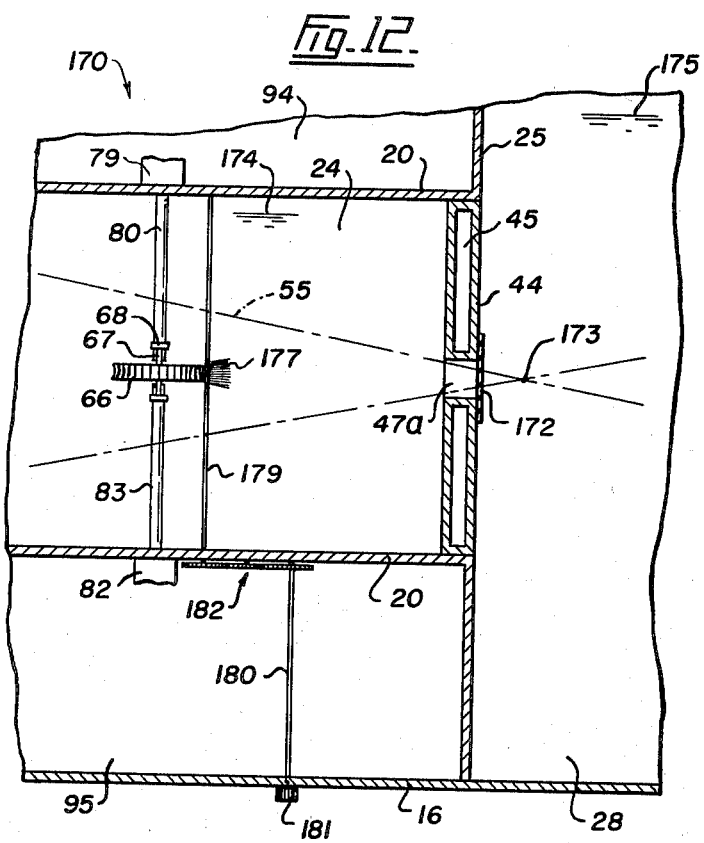
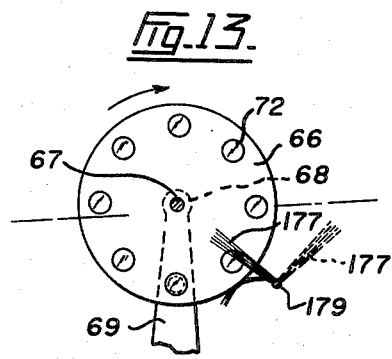

ULTRASOUND MEASURING INSTRUMENT

BACKGROUND OF THE INVENTION

This invention relates to an instrument for measuring the amplitude of ultrasonic vibrations.

DESCRIPTION OF THE PRIOR ART

It has previously been suggested that the output of an ultrasonic transducer could be checked by measuring the height of a column of liquid which is produced when the transducer is energized beneath a body of the liquid. This phenomena which results when acoustical energy is propagated through a liquid medium has been utilized in the instrument disclosed by U.S. Pat. No. 4,179,937 granted on Dec. 25, 1979 to John N. Koblanski. In this prior patent, a container is partially filled with liquid and a sound generator is mounted in the container below the liquid. An acoustic lens is interposed between the generator and the liquid so as to focus the sound waves produced by the generator at a point just below the surface of the liquid. A tube is supported in the container above the liquid and this tube carries a scale which is visible to the instrument operator. The vibrational energy produced when the sound generator is activated causes a column of the liquid to spurt upwardly into the tube so as to be readable against the scale. The patented instrument is very accurate but is not as easily coupled to a computer as the present instrument.

SUMMARY OF THE INVENTION

The present invention provides an improved means and method of measuring low as well as high amplitude sound emitted of an ultrasonic transducer by eliminating the need for an operator to read a scale thus ensuring a more accurate measurement of the sound amplitude. This desirable outcome is achieved in one embodiment of the invention by using sound waves to turn a disc and operatively connecting the disc to a pointer reading on a fixed scale thus providing a precise measurement of the intensity of the sound waves. According to another embodiment of the invention, a similar result is achieved by employing focused sound waves to drive a rotary shutter which interrupts a light beam and creates a series of light pulses. A counting device counts the light pulses and provides a numerical indication of the intensity of the sound waves. Thus, in either embodiment, the possibility of human error is eliminated and more accurate readings of the lower intensity sound waves are possible.

An instrument of this type is particularly well suited for testing a variety of sound generators but according to another aspect of the invention, the instrument can be employed in a system for controlling an industrial process. Some chemical processes and the like involve liquids which contain particles or constituents. It is sometimes necessary to keep a continuous check on the percentage of constituents in the liquid so that the process can be controlled accordingly and it is possible to use the present instrument to conduct such continuous testing. This is done by circulating the process liquid through a sound transparent container attached to the instrument in a position where the focused sound waves will travel through the container. A test liquid continuously circulated from the process flows through the container so that the measurement obtained will be different from a reference reading according to the constituents contained in the test liquid. The information provided by a comparison of the two readings is used when necessary to control automatic valves or the like which operate to control the process and bring the test liquid back to an acceptable condition.

BRIEF DESCRIPTION OF THE DRAWINGS

FIG. 1 is a horizontal section of one embodiment of the ultrasound measuring instrument, FIG. 2 is a longitudinal section taken on the line 2—2 of FIG. 1, FIG. 3 is an enlarged fragmentary section taken on the line 3—3 of FIG. 2 and showing a rotary shutter which forms part of a measuring means for indicating the intensity of sound, FIG. 4 is a side elevation of the rotary shutter, FIG. 5 is a diagram showing the measuring means provided on the instrument, FIG. 6 is a longitudinal section similar to FIG. 2 but showing another embodiment of the invention, FIG. 7 is a vertical section taken on the line 7—7 of FIG. 6 and showing a test container of the second embodiment, FIG. 9 is a transverse section of still another embodiment of the invention, FIG. 10 is a horizontal section taken on the line 10—10 of FIG. 9 and showing a rotary disc shutter of the third embodiment, FIG. 11 is a fragmentary plan view showing an additional intensity measuring scale as used on the third embodiment, FIG. 12 is a fragmentary horizontal section showing still another embodiment of the present invention, and FIG. 13 is a side elevation of a rotary shutter of the third embodiment showing brushing means for the shutter.

DESCRIPTION OF THE PREFERRED EMBODIMENTS

Figure 8:
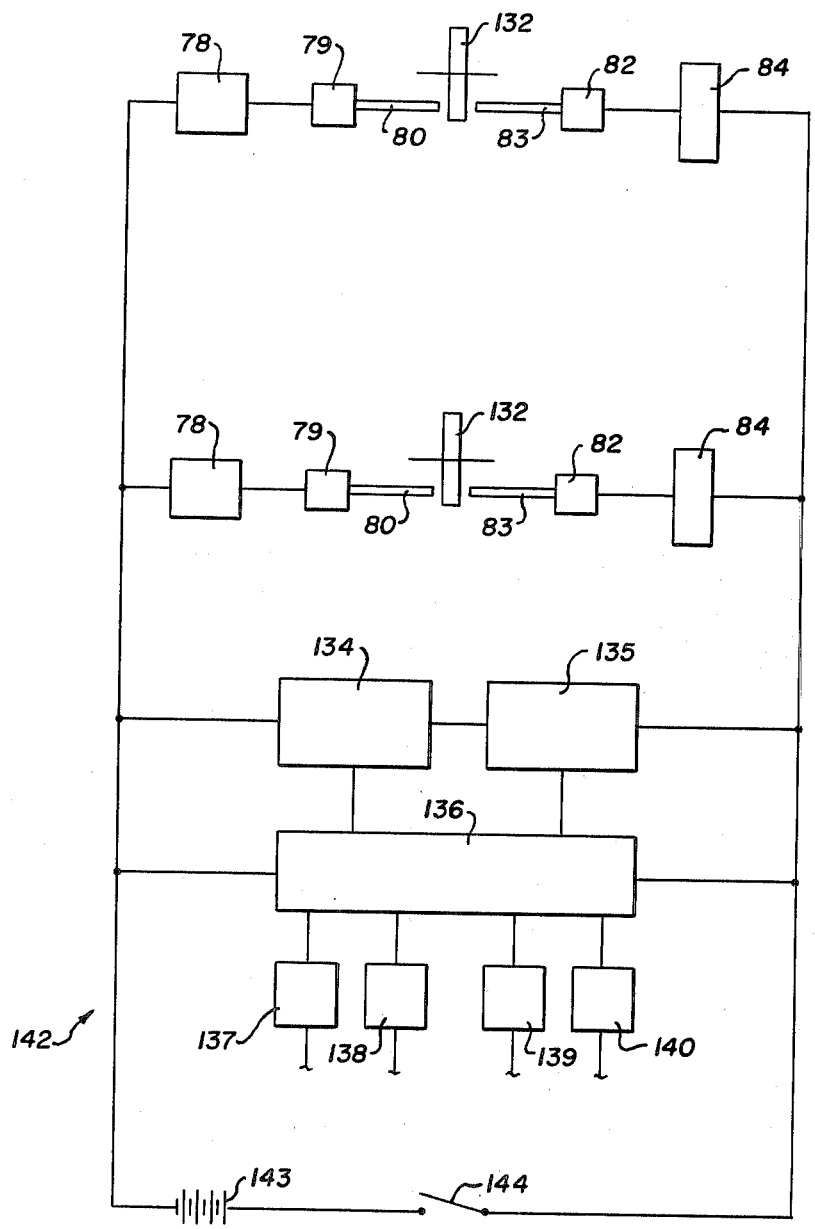
FIG. 8 is a diagram of a measuring means of the second embodiment.

Referring to the drawings, the numeral 10 indicates generally a preferred embodiment of the present instrument for measuring ultrasound. The instrument 10 is shown in FIGS. 1 and 2 as comprising a housing 12 which preferably is constructed of a suitable transparent plastic material. This flattened and generally oblong housing has bottom and top walls 14 and 15, side walls 16, and front and rear walls 17 and 18. Within the housing, there are longitudinally extending and transversely spaced partitions 20 supported between the bottom and top walls and this arrangement provides the housing with a tunnel-like chamber 24 extending from the rear wall 17 to a transverse partition 25 located in about the center of the housing. The vertical partition 25 forms one wall of a relatively large, oblong compartment 28 which is provided within the housing 12.

The instrument 10 is primarily intended for use in measuring the output of sound generators such as the transducer indicated at 30. A transducer of this type is used to produce ultrasonic vibrations for various therapeutic devices and the like. Such transducers require periodic testing and this can readily be done by means of the present instrument. The typical transducer 30 is entered into the rear end of the chamber 24 through an opening 32, see FIG. 2, formed in the top wall 15 of the housing. The therapeutic device may be held by hand during the test but normally the transducer is detached from the device and is supported in the chamber by suitable mounting means 34 (FIG. 1 only) which includes a holder 35 and spring-pressed plungers 36. The holder has a central opening 37 which exposes a major portion of a flat, front face 38 of the transducer. On the transducer, there is a plug-in 40 having a conductor cord 41 extending out of the housing to a high frequency oscillator (not shown) which in turn is electrically connected to a suitable source of alternating current. When the transducer is energized by the closing of a switch in such a circuit, it is caused to vibrate at a very high or ultrasonic frequency and the sound waves thus generated travel longitudinally through the chamber 24. The opposite or forward end of the chamber is closed by an acoustic barrier 44 which is supported by the transverse partition 25. This hollow, sound insulating barrier 44 provides an air space 45 which effectively stops the transmission of sound. A passageway 47 is provided in the centre of the barrier 44 to allow sound to travel from the chamber 24 into the compartment 28.

The sound waves generated by the transducer being tested must be focused or concentrated before low levels of ultrasound can be measured by the present instrument. Some transducers are dished or otherwise shaped to focus the sound waves they produce but, since the widely used transducer 30 has the flat face 38 from which sound waves emanate, the present apparatus 10 is shown provided with suitable means for focusing or concentrating the sound waves. The focusing means may take the form of a conventional stepped acoustic lens but, for the sake of simplicity, it is shown in FIGS. 1 and 2 as a parabolic reflector 50 combined with a reflecting cone 52. The reflector 50 is mounted on the transversely extending holder 35 opposite the transducer and concentric to the opening 37. A thin, flexible diaphragm 53 is secured to the reflector 50 and the cone 52 is carried by this diaphragm. The arrangement is such that sound waves generated by the transducer are reflected by the cone 52 and the parabolic reflector 50 so as to be focused or gathered together somewhat like a cone-shape beam 55 of sound concentrated at a focal point indicated by the numeral 56. In FIGS. 1 and 2, the boundaries of the conical sound beam 55 are represented by chain dotted lines and it will be noticed that the apex or focal point 56 of this sound beam is located almost within the passageway 47 leading into the compartment 28. The sound waves travel through the passageway and are dispersed and absorbed within the compartment as will be explained later.

It is well known that ultrasonic vibrations travel more freely through a liquid than through air and therefore the chamber 24 and the compartment 28 are both filled with an appropriate amount of a suitable non-viscous type liquid i.e., a very light oil or water. This sound-propagating liquid shown in FIG. 2 only and is indicated by the numeral 60. The oil or water 60 fills the chamber 24 ahead of the diaphragm 53 and, of course, also fills the passageway 47 between the chamber and the compartment. Thus, acoustic vibrations can travel beyond the focal point 56 and move through the passageway before diverging outwardly as they move into the compartment.

As sound waves travel longitudinally of the chamber 24, they exert a force or acoustic radiation pressure on any mass placed in the path of the sound waves. This force tends to propel the mass forward or towards the focal point 56. The strength of the force is dependent upon the acoustical output of the sound source and a measurement of the force will give an indication of sound amplitude. The instrument 10 is provided with measuring means which includes a shutter 66 which is rotatable by an acoustic a force. Referring now particularly to FIGS. 3 and 4, it will be seen the disc-like shutter 66 is fitted with an axle 67 and opposite ends of this axle are journalled in bearings 68 which are carried on posts 69. The posts are adjustably mounted on the bottom wall 14 of the housing so that the vertically-disposed shutter is centered in the chamber 24 reasonably close to the focal point 56 and in a position where the uppermost segment of the disc shutter projects into the cone-shaped beam of sound. FIG. 3 shows that the rotary disc shutter has an outer edge 70 which is transversely curved and preferably serrated as well. As the sound energy exerts it propelling force on the edge 70, the shutter is caused to rotate in a clockwise direction (FIG. 4) at a speed proportionate to the intensity of the sound waves.

It should be noted that the sound propagating medium provided by the oil 60 does not cause the rotary disc shutter 66 to rotate but rather it is the sound energy travelling as a cone-shaped beam through the chamber 24 which turns the shutter on its axis. Experiments conducted to determine what force actually turns the disc disclosed that rotation of the disc takes place before movement of the surrounding fluid occurs. The oil appears to transfer to the shutter the energy obtained from the passing sound waves and initial movement or streaming of the fluid occurs moments after the shutter first starts to rotate.

The rotary shutter 66 is intended to interrupt a beam of light and, for this purpose, the disc forming the shutter is made of an optically opaque material. Circumferentially spaced around the disc near its rim outer edge 70, are a number of windows 72 (FIG. 4) constructed of a material transparent to light. They alternate opaque and transparent areas on the rotating shutter serve to make and break any beam of light properly aimed at the disc.

The required light beam is produced by an electric circuit 75 which is shown diagrammatically in FIG. 5. This circuit includes a switch 76, a battery 77, an oscillator 78, and a light emitting diode (LED) 79 provided with a fibre optic rod 80 for a conductor. Also included in the circuit 75 is a photoelectric cell (PEC) 82 having a fibre optic rod 83, an amplifier 84, and a microprocessor or computer 85. Associated with the computer is a keyboard 86 and a counter 87 which preferably is the type having a digital display or readout 88, see FIG. 1. Also shown in FIG. 1, is the preferred arrangement for the several elements making up the circuit 75 where the rods 80 and 83 will be seen to be transversely aligned and supported to project into the chamber 24. The inner end of the rods are spaced apart to define a gap 89 (FIG. 3) and the shutter 66 rotates in this gap with the windows 72 progressively sweeping across the adjacent ends of the rods. All the remaining elements of the circuit 75 except the LED and PEC desirably are enclosed in containers 92 and 93 (FIG. 1) which conveniently can be housed in dry, viz. oil-free compartments 94 and 95 provided in the housing alongside the chamber 24. The digital readout 88 projects upwardly through a suitable opening formed in the top wall 15 of the housing as shown in FIG. 1.

As the sound waves move beyond the focal point 56 and diverge into the compartment 28, it is not desirable that the waves be allowed to reverberate so as to return and perhaps affect the speed of rotation of the shutter 66 which could result in an error in measuring the output of the transducer 30. The sound measuring instrument 10 therefore is provided within the compartment 28 with means for deflecting and absorbing the sound waves. As shown in FIGS. 1 and 2, the deflecting and absorbing means comprises an arrangement of sound reflectors which are designated 90, 91 and 92. These vertically standing reflectors are mounted in the compartment 28 to occupy the space between the bottom and top walls 14 and 15 of the housing. Reflector 90 is located in line with and spaced a short distance from the passageway 47. There are two reflectors 91 mounted in opposite corners of the compartment 28. The single reflector 92 is positioned in the compartment in longitudinal alignment with the passageway 47 and the reflector 90. The chain dotted lines indicated at 95 in FIG. 1 show the general area in which the sound waves are confined as they are reflected by the devices 90, 91, and 92 so as eventually to be totally absorbed within the confines of the reflector 90.

The ultrasound measuring instrument 10 is prepared for use in testing a possibly defective transducer 30 usually by first programming the computer 85. In order to do so, the keyboard 86 is operated to program the computer as required by the forthcoming test and in a manner which will allow the reading eventually obtained to be compared with a reading which would be expected from a serviceable transducer of the same type and known output of sound energy. The transducer is installed in the instrument and supported by the mounting means 34 so that, when the sound generator is energized, the resulting ways of sound focused by the cone 52 and reflector 50 will travel through the liquid 60 and be focused at the point 56. The passing sound waves rotate the shutter 66 and once it has reached a constant speed, the switch 76 is closed to activate the circuit 75. As light travels from the rod 79 to the rod 83, it is momentarily blocked by the rotary shutter and the cell 82 receives a series of light pulses which are converted by this element of the circuit 75 into electric pulses. These last mentioned pulses are amplified by the element 84 and fed to the preprogrammed computer 85. The readout 88 receives electric signals from the computer and operates to provide a multidigit number which tells the user of the instrument how the suspected transducer compares with a normal transducer.

Referring now to FIGS. 6, 7 and 8, this embodiment of the invention is an ultrasound measuring instrument 100 which comprises a housing 101. At least one but preferably two sample containers 104 are adapted to be mounted in this housing, the containers being longitudinally spaced apart with respect to a housing chamber 106 and entered therein through openings 107 formed in a top wall 108 of the housing. A transducer 110 of known capacity is supported at one end of the chamber on mounting means 111 and in contact with focusing means 112 which supports a diaphragm 113. Sound waves produced when the transducer is energized are concentrated at a focal point 116. As before, the focal point is located near a passageway 118 formed in a sound barrier 119. A compartment 120 in the housing contains a similar arrangement of reflectors 122, 123 and 124 which eventually absorb the generated sound waves. Oil 127 fills both the chamber 106 and compartment 120.

This embodiment of the invention is provided with two measuring means 130 having similar parts arranged are previously described. That is to say, there is a rotary shutter 132 mounted in the chamber 106 ahead of each sample container 104 as shown in FIG. 6. Other parts of the measuring means 130 are shown in FIG. 8 as comprising digital readouts 134 and 135, a preprogrammed computer 136, and four power amplifiers 137 to 140 which are electrically connected to motors (not shown) included a chemical process or the like. These parts are interconnected by a circuit 142 which includes a battery 143 and a control switch 144.

The foregoing embodiment of the invention is operated as a process control by connecting tubes 145 and 146 (FIG. 7) provided on each of the containers 104 into the system so that fluids to be tested will continually flow through the containers. Transducer 110 is energized and a standard solution is run through the containers 104 to obtain a normal reading of the contents of the solution. The standard solution is removed from the containers and test solutions from the system and then continuously run through the containers. The instrument 100 operates to monitor the solution which may vary from time to time. If the variation is too great, the computer 136 signals the power amplifiers controlling the several motors and the motors operate to control valves or the like serving to alter the system so as to bring it back to normal.

FIGS. 9, 10 and 11 show still another embodiment of the invention which is an ultrasound measuring instrument 150 similar in many respects to the preferred instrument 10. In this instance, the instrument has a housing 152 provided with bottom and top walls 153 and 154 which form parts of a chamber 155. A vertical spindle 156 extends through the oil-filled sound chamber of this instrument and is rotatably mounted in pivots 157 and 158 carried by the bottom and top walls of the housing. The top wall 154 is provided with a circular seal 160 (FIG. 11) and a pointer 161 is secured to the spindle to read on this scale. One end of a spiral hairspring 162 is secured to the spindle and the opposite end of this spring is secured to the top wall 153 by means of an adjustment pin 163.

The spindle 156 is fitted with a horizontally-disposed rotary disc shutter 165, see FIGS. 9 and 10. This shutter is opaque except for a spiral window 166 which progressively widens as it extends towards the circumference of the disc. Shutter 165 forms part of a measuring means generally indicated at 168, the means including a light emitting diode 169 and a photoelectric cell 170. Fibre optic rods 171 and 172 extend from the diode and cell to form a gap 173 in which the shutter rotates with the spiral window 166 in register with the ends of fibre rod conductors. The diode 169 and cell 170 as well as their conductors are included in a circuit which is generally indicated at 175 in FIG. 9. Circuit 175 interconnects an oscillator 176, a battery 177 a switch 178, an amplifier 179, a computer 180, a keyboard 181 and a counter 182 having a digital readout.

The shutter 165 is adapted to be turned by a cone of sound which is indicated at 185 in FIG. 9. The sound waves which form the cone are generated and focused by the same devices and in the same manner as in the preferred instrument 10. Also the sound waves moving beyond the focal point are absorbed by a similar arrangement of reflectors, located in an oil filled compartment of the housing 152.

The instrument 150 operates to measure the intensity of sound waves somewhat in the same manner as the instrument 10. As the waves travel through the chamber varying in intensity from minimum to maximum, the shutter 165 rotates through substantially 360° and allows more and more light to pass between the rods 171 and 172 until the counter 182 registers the total output of the transducer. The pointer 161 and scale can be watched to indicate if there are fluctuations or other abnormalties particularly at the lower levels of sound.

The sound measuring instruments 10 and 100 have each been described as having the chamber through which the sound waves initially travel, and the compartment in which the sound waves are eventually absorbed, both filled with the same liquid. In another embodiment of the invention shown in FIGS. 12 and 13, a sound measuring instrument 170 is provided which contains suitably separated bodies of water and oil. The device 170 is closely related to the instrument 10 and is shown to have corresponding parts indicated by the same reference numerals. In other words; the instrument 170 has a chamber 24, a compartment 28, and the acoustic barrier 44 in which a relatively large diameter opening 47a is formed. A very thin, sound transparent diaphragm 172 is attached to the barrier to cover the opening 47a. The enlarged opening in the barrier allows the sound waves generated by the transducer 30 and focused by the reflector 50 to be concentrated at a focal point 173 located just inside the compartment 28. The chamber 24 is filled with water which is indicated at 174 and the compartment 28 is filled with a light oil which is indicated at 175.

The use of contrasting fluids in the instrument 170 has been found to be particularly well suited in the measurement of sound at low intensities. Because the shutter 66 is immersed in the body of water 174, it rotates more freely than would be the case if even a slightly viscous fluid was used and this ensures that precision readings can be obtained of low intensity sound waves. The light oil 175 in the compartment as well as the system of reflectors 90, 91 and 92 in that compartment combine as before to deflect and absorb the sound waves as those waves pass beyond the focal point 173. The diaphragm 172, of course, is transparent to the passage of the sound waves and prevents mixing of the water and oil.

The sound measuring instrument 170 operates extremely well although it has been found that the passage of sound waves through the water causes cavitation in that fluid. In other words, minute bubbles are formed in the water and these bubbles tend to adhere to the shutter 66. The presence of the bubbles it is believed might eventually have some influence in the speed of rotation of the shutter 66 and therefore the instrument 170 is provided with a suitable means for periodically removing any accumulation of bubbles. In FIGS. 12 and 13, the bubble removing means is shown to comprise a brush 177 which is formed of a single row of very fine nylon bristles radiating outwardly in substantially the same plane from a length of wire 179. This wire extends across the chamber 24 near the bottom wall 14 and slightly ahead of the shutter 66, the wire being journalled in the partitions 20. A spindle 180, see FIG. 12, is rotatably mounted in one of the side walls 16 and the outer end of this spindle is fitted with a turning knob 181 while the inner end of the spindle is connected by a suitable drive train 182 to an end of the wire 179. The arrangement is such that the brush 177 can be swung into and out of engagement with the shutter 66 by appropriate partial turns of the knob 181. Thus, the operator of the instrument 170 is able periodically to remove any accumulation of bubbles on the shutter 66 simply by actuating the above described brushing means. An obvious alternative to the manually operated brushing means would be to swing the brush 177 into and out of engagement with the shutter 66 by a drive mechanism controlled by a timer. A similar bubble removing brush could just as readily be provided for the sound measuring instrument 100 should water be used in the chamber 155 in lieu of the previously mentioned oil.

The ultrasound measuring instrument 100 is used to measure the sound reflecting properties of fluid samples. A few samples which might be tested are highly reflective and this could influence the movement of sound waves passing through the chamber 106. If this occurred, it is possible the speed of rotation of the disc shutters could be slowed to give a false reading and it is therefore suggested that the instrument 170 be modified slightly to allow the processing of highly reflective samples. This would be done by locating the focal point 173 within the chamber 24 close to the diaphragm 172. A sample container 104 is mounted in the compartment 28 reasonably close to the diaphragm. The reflective sample is flowed through this container and sonic energy is not reflected back towards the transducer as might otherwise be the case if such a sample was tested within the chamber 24. One reason for this is that the focused rays of sound which diverge beyond the focal point will reflect back and encounter the sound insulating barrier 44 so as to be brought to a halt. Another reason is that the more perpendicular rays likely to travel through the opening 47a are scattered by the turbulent liquid in the vicinity of the focal point now located within the chamber.

If a sample having very low attenuation properties is to be tested, it is suggested that the chamber 24 be filled with such a test sample. Provision is made to flow the test sample through the chamber and it has been found that this can be done without contaminating the rotary shutter. This relatively large volume of test sample enable a very accurate measurement to be made of a low attenuation liquid.

I claim:

1. An ultrasonic measuring instrument comprising a chamber, mounting means for supporting a sound generator at one end of the chamber, focusing means near said one end of the chamber for concentrating sound waves emanating from sound generator at a focal point near an opposite end of the chamber, and measuring means for determining the intensity of the sound waves including a movable member supported within the chamber to project into the energy beam, said movable member being moved by the sound waves to an extent related to the intensity of said waves, and an indicating system actuated by movement of the movable member to provide an indication of the intensity of the sound waves, said indicating system comprising a spindle rotatably supporting the movable member within the chamber, a pointer carried by the spindle, and a scale on the housing adapted to be swept by the pointer.

2. An instrument as claimed in claim 1, in which said movable member is a rotary shutter, said indicating system including light transmitting and receiving means cooperating with the rotary shutter to produce a series of light pulses, and means for converting the light pulses into a reading indicative of the intensity of the sound waves.

3. An ultrasonic measuring instrument comprising a chamber, mounting means for supporting a sound generator at one end of the chamber, focusing means near said one end of the chamber for concentrating the sound waves at a focal point near the opposite end of the chamber, measuring means having a rotary shutter supported within the chamber in a position to be rotated by passage of the concentrated sound waves at a speed proportionate to the intensity of said waves, said measuring means including an electric circuit having light transmitting and receiving elements arranged to transmit and receive a ray of light projected across the rotary shutter whereby the ray of light is transformed into a series of light pulses, and a counter operatively connected by the electric circuit to the light receiving element for counting the series of light pulses and converting that count into a reading indicative of the intensity of the sound waves.

4. An instrument as claimed in claim 3, and including means located beyond the focal point for absorbing the sound waves.

5. An instrument as claimed in claim 3, in which said light transmitting and receiving means respectively are a light emitting diode and a photoelectric cell, said electric circuit including a light conductor providing a path of travel for the ray of light projected beyond the diode to the cell, said light conductor having a gap in which the rotary shutter is located.

6. An instrument as claimed in claim 5, in which said rotary shutter is a disc rotatably mounted in the chamber with a segment of said disc located within the gap and projecting across the path of travel of the sound waves, said disc having a plurality of light transmitting and light blocking areas alternatively arranged around the circumference of said disc to progressively swing into momentary register with the light conductor.

7. An instrument as claimed in claim 6, in which said chamber is filled with a sound-propagating liquid.

8. An ultrasound measuring instrument comprising a housing providing an elongated chamber and a compartment, mounting means for supporting a sound generating transducer at one end of the elongated chamber whereby activation of said transducer generates sound waves directed generally towards an opposite end of said chamber, focusing means carried by the housing near said one end of the elongated chamber for shaping the sound waves substantially as a cone and concentrating the waves at a focal point near the opposite end of the chamber, and measuring means for indicating the intensity of the sound waves including a rotary disc shutter, mounting means rotatably supporting the shutter within the elongated chamber with a segment of said shutter located within the cone near the focal point to be rotated by the sound waves at a speed proportionate to the intensity of the sound waves, said shutter having openings equidistantly spaced apart and arranged circumferentially around the axis of rotation of the shutter, a light emitting diode located on one side of the shutter, electric circuit means connecting the diodes to a source of power, a photoelectric cell located on the opposite side of the shutter, a light conductor extending from the diode to the cell, said light conductor having a gap accommodating the shutter so that the openings progressively come into register with adjacent ends of the conductor defining the gap, said cell receiving a series of light pulses from the diode and converting those pulses into corresponding electrical pulses, and an amplifier and a counter electrically connected to the cell whereby visual indication is given of the intensity of the sound waves generated by the transducer.

9. An instrument as claimed in claim 8, in which said elongated chamber and compartment are separated by an acoustic barrier having a passageway aligned with and located near the focal point, said compartment housing a plurality of co-operating sound reflectors adapted to absorb the sound waves beyond the focal point.

10. An instrument as claimed in claim 9, in which said elongated chamber and compartment are filled with a sound-propagating liquid.

11. An instrument as claimed in claim 10, and including brushing means mounted in the chamber for movement into and out of brushing engagement with the shutter.

12. An instrument as claimed in claim 8, and including a sound transparent container for a test liquid having constituents capable of being acoustically measured, said housing being provided with support means for supporting the container extending across the elongated chamber in the path of travel of the sound waves between the sound generating transducer and the focal point whereby the visual indication given by the counter reflects the amount of constituents in the test liquid.

13. A method of measuring the intensity of ultrasound comprising the steps of:
  activating a sound generator to cause sound waves to travel through a liquid contained within a chamber,
  concentrating the sound waves at a focal point to shape the waves as a cone of sound,
  interposing a rotatable member in the cone of sound to be rotated by acoustic energy at a speed proportionate to the intensity of the sound waves,
  converting the speed of rotation of the rotatable member into light pulses,
  changing the light pulses into amplified electrical pulses, and
  using the amplified electrical pulses to generate a counting device capable of providing visual indication of the intensity of the sound waves eminating from the sound generator.

14. The method as claimed in claim 13, and including a further step of absorbing the sound waves beyond the focal point.

15. The method as claimed in claim 13, and including a further step of placing a sound transparent container filled with a test substance in the path of the sound waves between the sound generator and the focal point, and comparing the resulting readings with the previously obtained reading to measure the sound transmitting properties of the test substance.

* * * * *